(12) United States Patent
Socha et al.

(10) Patent No.: US 12,023,735 B2
(45) Date of Patent: Jul. 2, 2024

(54) THERMALLY DECOMPOSABLE BUILD PLATE STRUCTURE FOR STABILIZATION OF METAL BUILD SURFACE DURING 3D PRINTING AND FACILE RELEASE OF 3D PRINTED OBJECTS

(71) Applicant: INDIUM CORPORATION, Utica, NY (US)

(72) Inventors: David P. Socha, Whitesboro, NY (US); Mark K. Olearczyk, Barneveld, NY (US)

(73) Assignee: INDIUM CORPORATION, Utica, NY (US)

( * ) Notice: Subject to any disclaimer, the term of this patent is extended or adjusted under 35 U.S.C. 154(b) by 0 days.

(21) Appl. No.: 18/125,965

(22) Filed: Mar. 24, 2023

(65) Prior Publication Data

US 2023/0302541 A1 Sep. 28, 2023

Related U.S. Application Data

(60) Provisional application No. 63/323,194, filed on Mar. 24, 2022.

(51) Int. Cl.
*B22F 12/30* (2021.01)
*B33Y 30/00* (2015.01)
*B33Y 40/00* (2020.01)

(52) U.S. Cl.
CPC .............. *B22F 12/30* (2021.01); *B33Y 30/00* (2014.12); *B33Y 40/00* (2014.12)

(58) Field of Classification Search
None
See application file for complete search history.

(56) References Cited

U.S. PATENT DOCUMENTS 3,614,980 A  10/1971 Lander
5,980,812 A  11/1999 Lawton
(Continued)

FOREIGN PATENT DOCUMENTS

CN    102921927 B   6/2014
CN    108247066 A   7/2018
(Continued)

OTHER PUBLICATIONS

International Search Report and Written Opinion dated May 26, 2023 for International Application No. PCT/US2023/016220, filed Mar. 24, 2023.

(Continued)

*Primary Examiner* — Colin W. Slifka
(74) *Attorney, Agent, or Firm* — Sheppard, Mullin, Richter & Hampton LLP

(57) ABSTRACT

Some implementations of the disclosure are directed to an additive manufacturing build plate structure for metal build surface stabilization during 3D printing and facile release of 3D printed objects. The build plate includes a body having a recessed section formed through a first surface of the body, the recessed section including a bottom surface within the body and sidewalls extending to the bottom surface. The recessed section is configured to be filled with a solid form of a metal or metal alloy that provides a printing surface for forming a 3D object in a 3D printing device. The recessed section includes a locking mechanism configured to prevent lift-up of the solid form of the metal or metal alloy during 3D printing in the 3D printing device.

19 Claims, 8 Drawing Sheets

(56) References Cited

U.S. PATENT DOCUMENTS

| | | |
|---|---|---|
| 6,298,904 B2 | 10/2001 | Polich |
| 6,375,880 B1 | 4/2002 | Cooper et al. |
| 6,446,698 B1 | 9/2002 | Soderstrom et al. |
| 6,547,552 B1 | 4/2003 | Fudim |
| 6,830,643 B1 | 12/2004 | Hayes |
| 7,140,415 B1 | 11/2006 | Wilson et al. |
| 8,627,875 B1 | 1/2014 | Pinkstock et al. |
| 9,321,215 B2 | 4/2016 | Dudley |
| 2003/0065400 A1 | 4/2003 | Beam et al. |
| 2004/0242728 A1 | 12/2004 | Xu et al. |
| 2005/0016707 A1 | 1/2005 | Osanai et al. |
| 2005/0156361 A1 | 7/2005 | Holowczak et al. |
| 2007/0126157 A1 | 6/2007 | Bredt |
| 2008/0042321 A1 | 2/2008 | Russell et al. |
| 2010/0252713 A1 | 10/2010 | Saito |
| 2011/0097498 A1 | 4/2011 | Yen et al. |
| 2012/0018115 A1 | 1/2012 | Hovel et al. |
| 2012/0146261 A1 | 6/2012 | Beuerlein |
| 2012/0156466 A1 | 6/2012 | Bell et al. |
| 2015/0145174 A1 | 5/2015 | Comb |
| 2015/0258744 A1 | 9/2015 | Muller et al. |
| 2015/0360287 A1 | 12/2015 | Zink et al. |
| 2015/0367411 A1 | 12/2015 | Witmyer et al. |
| 2016/0031010 A1 | 2/2016 | O'Neill et al. |
| 2016/0082656 A1 | 3/2016 | Yu et al. |
| 2016/0175923 A1 | 6/2016 | Liu et al. |
| 2016/0176118 A1 | 6/2016 | Reese et al. |
| 2016/0332387 A1 | 11/2016 | Jondal et al. |
| 2017/0252819 A1 | 9/2017 | Gibson et al. |
| 2018/0043612 A1 | 2/2018 | Gray et al. |
| 2018/0117854 A1 | 5/2018 | Hart et al. |
| 2018/0200800 A1 | 7/2018 | Hart et al. |
| 2018/0236557 A1 | 8/2018 | Garay et al. |
| 2019/0009332 A1 | 1/2019 | Rockstroh |
| 2019/0160734 A1 | 5/2019 | Biesboer et al. |
| 2019/0177473 A1 | 6/2019 | Bashir et al. |
| 2019/0375014 A1 | 12/2019 | Kernan et al. |
| 2020/0001351 A1 | 1/2020 | Lin et al. |
| 2020/0101534 A1 | 4/2020 | Gibson |
| 2021/0053122 A1 | 2/2021 | Socha et al. |

FOREIGN PATENT DOCUMENTS

| | | |
|---|---|---|
| CN | 108748993 A | 11/2018 |
| EP | 2986406 | 2/2016 |
| EP | 3424620 A1 | 1/2019 |
| EP | 3461572 A1 | 4/2019 |
| EP | 3084129 B1 | 5/2019 |
| EP | 3486008 | 5/2019 |
| JP | H09-216047 A | 8/1997 |
| JP | 2010-100883 | 5/2010 |
| JP | 5189953 B2 | 4/2013 |
| KR | 2010-0064195 A | 6/2010 |
| WO | WO 2017/152142 | 9/2017 |
| WO | WO 2021/262679 | 12/2021 |

OTHER PUBLICATIONS

Hendrixson, Stephanie, "Machining Module Automates 3D-Printed Part Removal," Modern Machine Shop, Additive Manufacturing, Dec. 6, 2017, 1 page, https://www.mmsonline.com/blog/post/machining-module-automates-3d-printed-part-removal.

Lefky et al., "Dissolvable Supports in Powder Bed Fusion-Printed Stainless Steel," 3D Printing and Additive Manufacturing, vol. 4, No. 1 (2017), 11 pages, https://www.liebertpub.com/doi/pdfplus/10.1089/3dp.2016.0043.

StrataSys Press Release, "Pioneering a New Era in 3D Printed Production Metal Parts," Nov. 13, 2018, 4 pages, http://investors.stratasys.com/news-releases/news-release-details/pioneering-new-era-3d printed-production-metal-parts.

International Search Report and Written Opinion dated Nov. 3, 2020 for International Application No. PCT/US2020/047213, filed Aug. 20, 2020.

International Search Report and Written Opinion dated May 27, 2022 for International Application No. PCT/US2022/017546, filed Feb. 23, 2022.

International Search Report and Written Opinion dated Jun. 8, 2022 for International Application No. PCT/US2022/017529, filed Feb. 23, 2022.

European Examination Report—Communication pursuant to Article 94(3) EPC dated Jan. 10, 2023 for European Application No. 20767660.2.

Non-final Office Action dated Apr. 24, 2023 for U.S. Appl. No. 17/678,752, filed Feb. 23, 2022.

Non-final Office Action dated May 3, 2023 for U.S. Appl. No. 17/678,820, filed Feb. 23, 2022.

Non-final Office Action dated Jan. 17, 2023 for U.S. Appl. No. 16/998,650, filed Aug. 20, 2020.

Final Office Action dated Nov. 2, 2023 for U.S. Appl. No. 17/678,820.

Final Office Action dated Nov. 16, 2023 for U.S. Appl. No. 17/678,752.

THERMALLY DECOMPOSABLE BUILD PLATE STRUCTURE FOR STABILIZATION OF METAL BUILD SURFACE DURING 3D PRINTING AND FACILE RELEASE OF 3D PRINTED OBJECTS

CROSS-REFERENCE TO RELATED APPLICATIONS

This application claims priority to U.S. Provisional Patent Application No. 63/323,194, titled "THERMALLY DECOMPOSABLE BUILD PLATE STRUCTURE FOR STABILIZATION OF METAL BUILD SURFACE DURING 3D PRINTING AND FACILE RELEASE OF 3D PRINTED OBJECTS" filed Mar. 24, 2022, which is incorporated herein by reference in its entirety.

DESCRIPTION OF THE RELATED ART 3D printing, also known as additive manufacturing, has gained in popularity as a technique to manufacture both prototypes and industrial parts. Increasingly, these parts have permeated into all sectors of industrial manufacturing including the aerospace, automotive, and dental sectors.

The process of additive manufacturing involves depositing print material into sequential layers onto a build plate until the desired 3D print is formed. 3D printing methods build parts layer by layer, but most require a platform or build plate to serve as the starting point. The first few layers of print material will bond onto the surface of the build plate, and the following layers build on this surface. When 3D printing 3D metal printed parts, the feedstock is made of metal powders or combination of powders. The build plate is placed into the 3D printing machine. Once the machine is activated, a blade deposits a layer of metal powder over the build plate. A laser or series of lasers selectively sinters the metal that will become part of the 3D printed object. The first few passes of the laser essentially weld what will become the 3D printing object to the build plate. The blade then deposits new powdered metal across the surface of the build plate. Selective sintering is repeated and the object is created layer by layer.

Despite the increasing use of additive manufacturing in high-tech industries, separation of the part from the build plate is still widely accomplished by cutting. Cutting devices used to separate the parts from the build plate include, hack saws, band saws, wire electrical discharge machines (EDM), and others. While the use of such devices is effective, it can be time consuming, and it can require large capital equipment purchases such as in the case of a wire EDM. Often, the removal and post-processing equipment can occupy a larger percentage of the shop floor than the machine(s) used for powder bed fusion to create the 3D printed part(s). In addition, mechanical separation of the 3D printed part from the build plate can require significant post-processing of both the removed part(s) and the build plate surface.

BRIEF SUMMARY

Some implementations of the disclosure relate to a build plate structure for metal build surface stabilization during 3D printing and facile release of 3D printed objects.

In one embodiment, an additive manufacturing build plate includes a body having a recessed section formed through a first surface of the body, the recessed section including a bottom surface within the body and sidewalls extending to the bottom surface, wherein: the recessed section is configured to be filled with a solid form of a metal or metal alloy that provides a printing surface for forming a 3D object in a 3D printing device; and the recessed section comprises a locking mechanism configured to prevent lift-up of the solid form of the metal or metal alloy during 3D printing in the 3D printing device.

In some implementations, the locking mechanism comprises the sidewalls; and at least one of the sidewalls is angled such that a perimeter of the bottom surface of the recessed section is greater than a perimeter of a top of the recessed section.

In some implementations, the at least one of the sidewalls is angled from 5 degrees to 45 degrees relative to a perpendicular to the bottom surface of the recessed section.

In some implementations, the locking mechanism comprises a through hole formed through the bottom surface of the recessed section to a second surface of the body opposite the first surface, the through hole having an opening that is larger at the second surface of the body than at the bottom surface of the recessed section.

In some implementations, the through hole is tapered from the second surface of the body to the bottom surface of the recessed section.

In some implementations, the through hole is tapered at an angle from 5 degrees to 45 degrees relative to a perpendicular to the bottom surface of the recessed section.

In some implementations, the through hole is a counterbore or countersink.

In some implementations, the through hole is a pour through hole for filling the recessed section with a liquid form of the metal or metal alloy that solidifies into the solid form.

In some implementations, the through hole is an air hole configured to release air displaced by pouring a liquid form of the metal or metal alloy in the recessed section.

In some implementations, the locking mechanism comprises one or more blind holes formed through the bottom surface of the recessed section to an interior of the build plate, each of the one or more blind holes having an opening that is smallest at the bottom surface of the recessed section.

In some implementations, the locking mechanism comprises a channel extending along at least a portion of the sidewalls or the bottom surface of the recessed section.

In some implementations, the channel comprises multiple dovetails.

In some implementations, the locking mechanism comprises one or more subtractive features that extend partially or fully through the body toward an exterior surface of the body.

In some implementations, the locking mechanism further comprises one or more additive features present in the recessed section, the one or more additive features comprising one or more positive topographical features.

In some implementations, the additive manufacturing build plate further comprises: the solid form of the metal or metal alloy within the recessed section.

In some implementations, the metal or metal alloy has a solidus temperature that is lower than a solidus temperature of the body and lower than a solidus temperature of the 3D object.

In one embodiment, a method comprises: obtaining an additive manufacturing build plate comprising a body having a recessed section formed through a first surface of the body, the recessed section including a bottom surface within the body and sidewalls extending to the bottom surface; and forming, within the recessed section, a solid form of a metal or metal alloy that has a printing surface for forming a 3D object in a 3D printing device, wherein the recessed section comprises a locking mechanism configured to prevent lift-up of the solid form of the metal or metal alloy during 3D printing in the 3D printing device.

In some implementations, forming the solid form of the metal or metal alloy comprises pouring, into a pour through hole of the recessed section, a liquid form of the metal or metal alloy that solidifies into the solid form; and releasing, via an air through hole of the recessed section, air displaced by the liquid form of the metal or metal alloy, wherein: the solid form of the metal or metal alloy extends into the pour through hole and into the air through hole, the locking mechanism comprises the pour through hole and the air through hole, and prior to being filled with the solid form of the metal or metal alloy, the pour through hole and the air through hole each has an opening that is larger at an exterior surface of the body than at the bottom surface of the recessed section.

In some implementations, the method further comprises: after forming the solid form of the metal or metal alloy, placing the additive manufacturing build plate in the 3D printing device; and 3D printing the 3D object on the printing surface, wherein the metal or metal alloy has a solidus temperature lower than a solidus temperature of the additive manufacturing build plate and the 3D object, and the locking mechanism prevents lift-up of the solid form of the metal or metal alloy caused at least in part by a temperature increase of the metal or metal alloy during 3D printing.

In one embodiment, a method comprises: placing an additive manufacturing build plate in a 3D printing device, the additive manufacturing build plate comprising: a body having a recessed section formed through a first surface of the body, the recessed section including a bottom surface within the body and sidewalls extending to the bottom surface; and a solid form of a metal or metal alloy within the recessed section, wherein the solid form includes a printing surface for forming a 3D object in the 3D printing device, the metal or metal alloy has a solidus temperature lower than a solidus temperature of the additive manufacturing build plate and the 3D object, and the recessed section comprises a locking mechanism; and 3D printing the 3D object on the printing surface of the solid form of the metal or metal alloy, wherein during 3D printing the locking mechanism prevents lift-up of the solid form of the metal or metal alloy caused at least in part by a temperature increase of the metal or metal alloy.

In some implementations, the method further comprises: after printing the 3D object, melting the solid form of the metal or metal alloy to release the 3D object from the additive manufacturing build plate.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more implementations, is described in detail with reference to the following figures. The figures are provided for purposes of illustration only and merely depict example implementations. Furthermore, it should be noted that for clarity and ease of illustration, the elements in the figures have not necessarily been drawn to scale.

Some of the figures included herein illustrate various implementations of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

The figures are not exhaustive and do not limit the present disclosure to the precise form disclosed.

DETAILED DESCRIPTION

There is a need for improving techniques in additive manufacturing for removing workpieces that are attached to a build plate. One challenge is to free the parts without damaging them, but also to protect the build plate so that it can be reused. As noted above, mechanical means, such as by use of a bandsaw or wire EDM, are typically employed to cut and remove a 3D printed object from a build plate outside of the 3D printer. The build plate may then be machined separately to remove excess material and return them to a usable state. However, as discussed above, such approaches may be time-consuming and require significant post processing time. Additionally, such approaches may require additional consumable metal powder to have sufficient standoff between the part and the build plate to allow access for the band saw or wire EDM clearance.

One recently proposed technique that has proven effective for removal of 3D printed parts, and overcomes the challenges listed above, involves a thermally decomposable build plate design that utilizes a lower melting point metal as the build surface that allows parts printed by powder bed fusion to be released in seconds with a mild thermal treatment. In contrast to mechanical removal of a 3D printed metal part that often necessitates hours of post processing to reshape and polish the bottom of the object and to resurface the build plate for reuse, a thermally decomposable build plate enables facile removal of a 3D printed object from the build plate without damage to the 3D printed part, and little or no post processing, finishing, reshaping, and/or polishing of the 3D printed object.

Implementations of the disclosure describe additional improvements of the thermally decomposable build plate design that can help prevent lift-up of the metal printing surface, improve tolerance of the printed parts, improve the user experience, and increase throughput. To this end, a build plate may include structural features incorporated into an interior of a recessed section of the build plate, and designed to help secure a metal within an interior recessed section of the build plate, to prevent lift-up and build failure during 3D printing. As further described below, such structural features for securing the metal may be straight, tapered, dovetail-shaped or irregularly shaped. There may be one feature or many features. There may be multiple features of the same type or a combination of different types of features. These and other implementations are further described below.

Figure 1A:
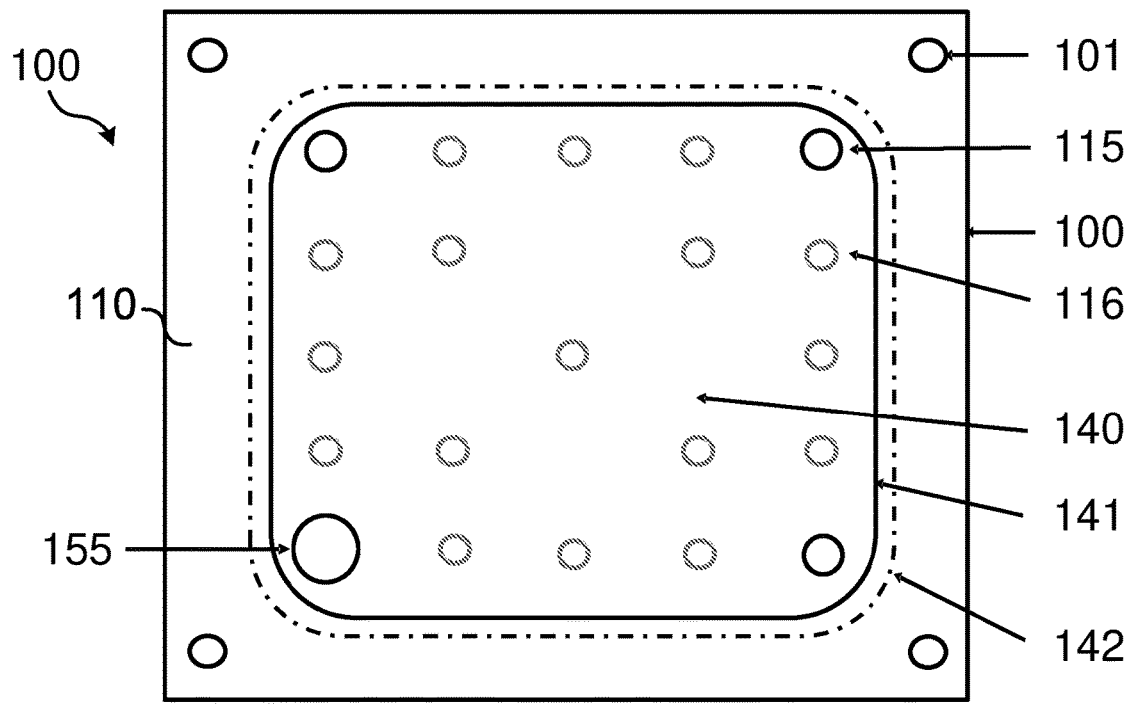
FIG. 1A shows a top view of a build plate including a locking mechanism for preventing, during 3D printing, lift-up of a solid metal printing structure formed in the build plate prior to 3D printing, in accordance with some implementations of the disclosure.
Figure 1B:
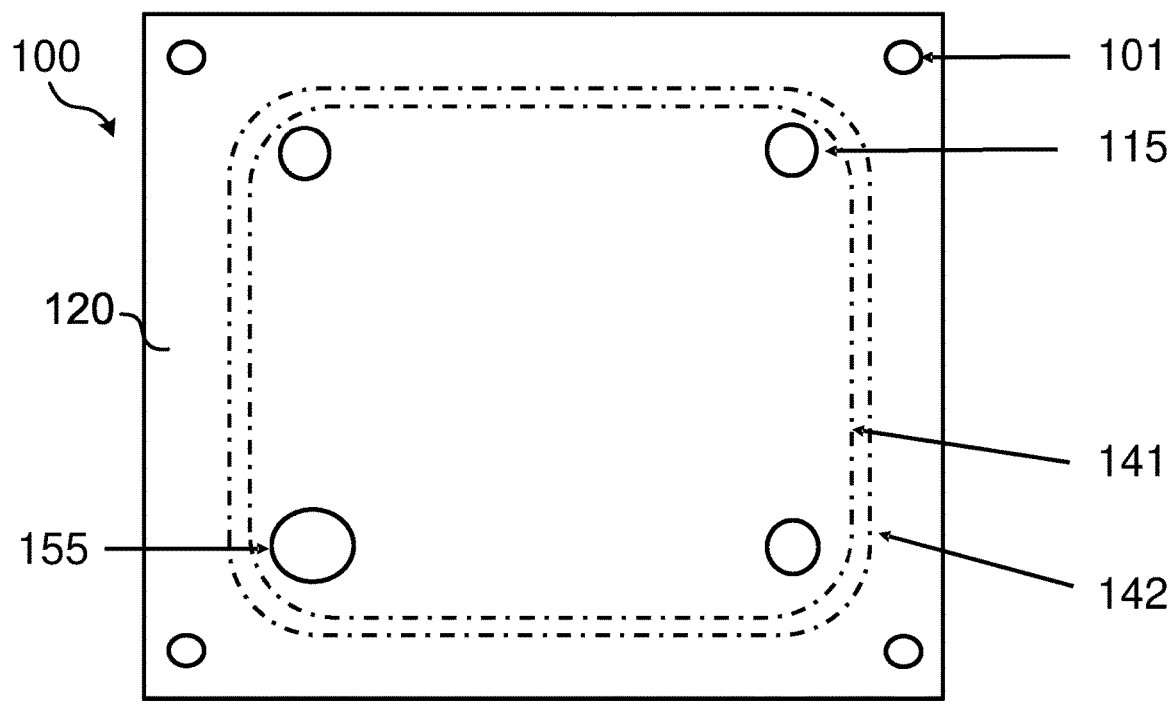
FIG. 1B shows a bottom view of the build plate of FIG. 1A.
Figure 1C:
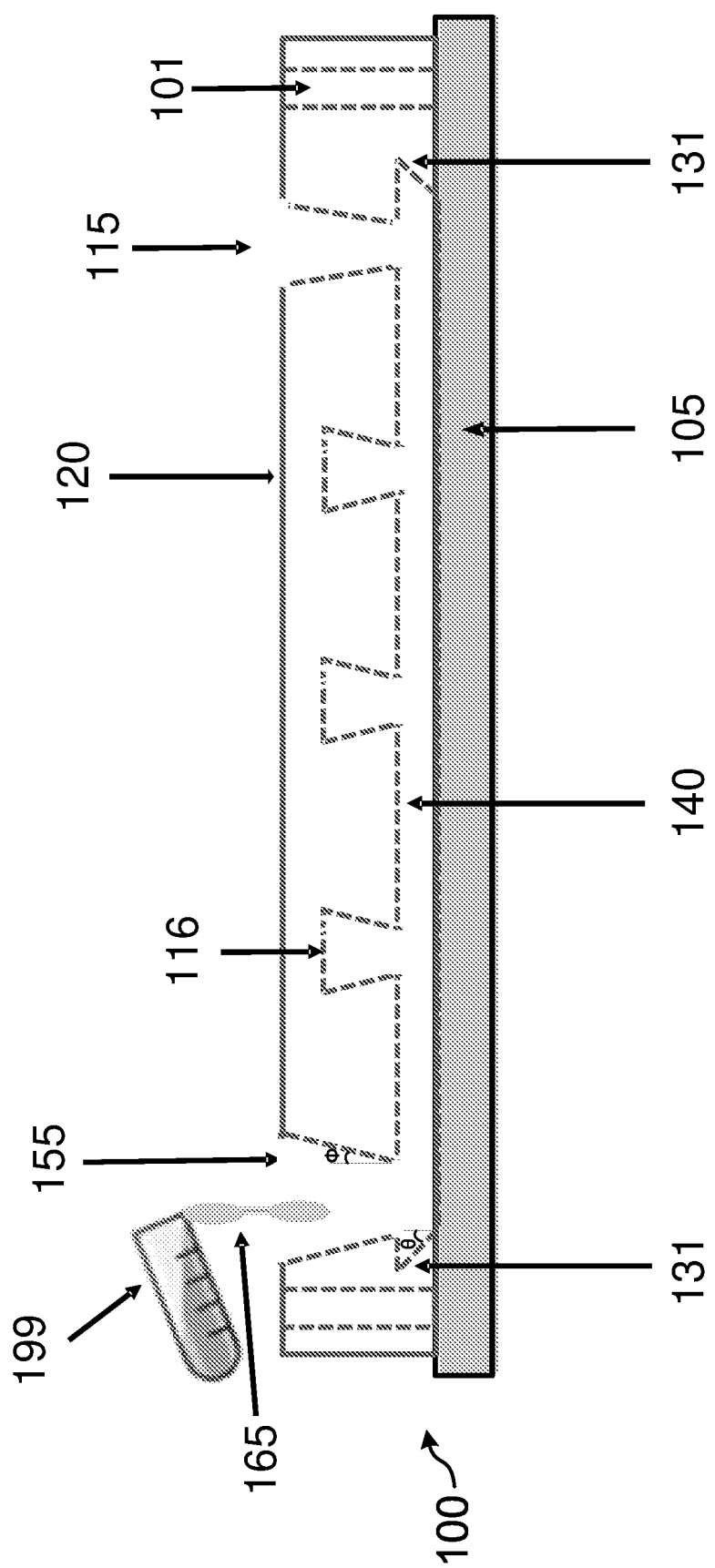
FIG. 1C shows a cross-sectional side view of the build plate of FIG. 1A.

FIGS. 1A, 1B, and 1C respectively show top, bottom, and cross-sectional side views of a build plate 100 that can be used for additive manufacturing or 3D printing in accordance with implementations of the disclosure. As shown, build plate 100 includes a top surface 110, a bottom surface 120 and four sidewalls that extend between the top and bottom surfaces. The build plate 100, including the top, bottom, and side surfaces, may be made of copper, stainless steel, tool steel, tin, aluminum, cemented carbide, ceramic, graphite, or some other suitable material. In particular, as further described below, the build plate 100 may be made of material (e.g., metal or metal alloy) having a solidus temperature that is substantially higher (e.g., at least 30° C.) than that of a thermally decomposable material that is placed or formed in its recessed section 140, and used to create a bond between build plate 100 and a 3D printed object during 3D printing. For example, the build plate 100 may have a melting temperature that is greater than 1000° C.

Although depicted in the shape of a rectangular prism or cuboid having sidewalls that extend perpendicularly between the top surface 110 and bottom surface 120, it should be noted that in other implementations build plate 100 may be some other suitable shape, e.g., circular or a trapezoidal prism, that may be used to implement the 3D printing techniques described herein.

In this example, means for attachment of build plate 100 to a 3D printing apparatus are represented by slots or holes 101 (e.g., bolt holes) in each corner of top surface 110. Structural protrusions (e.g., bolts or tabs) of the 3D printing apparatus may be inserted into holes 101 to hold the build plate 100 in place during 3D printing. Although holes 101 are illustrated in each corner of top surface 100, it should be appreciated that depending on the implementation, build plate 100 may include holes 101 and/or protrusions in any suitable location on top surface 110, bottom surface 120, and/or other surface of build plate 100 to facilitate attachment to the 3D printing apparatus. In some implementations, holes 101 may be included on bottom surface 120 and not on top surface 110 to prevent powdered metal from 3D printing to fall into holes 101. In some implementations, a protrusion (e.g., bolt or tab) may be used in place of a hole 101. For example, the protrusion may couple to a hole of the 3D printing apparatus.

Build plate 100 includes a mortised or recessed section 140 extending through its center. The recessed section 140 includes a bottom surface and slanted or angled sidewalls 131 such that a top surface perimeter 141 of the recessed section 140 is smaller than a bottom surface perimeter 142 of the recessed section 140. In other words, the recessed section tapers toward the top of build plate 100. Although the depicted examples show four slanted sidewalls such that the bottom surface perimeter 142 is greater than the top surface perimeter 141 along every side or dimension, the number of sidewalls 131 that are slanted may be one or more such that the bottom surface perimeter 142 is greater than the top surface perimeter 141 along at least one side. As further described below, the recessed section 140 may be filled with a lower melting temperature metal or metal alloy to form a solid metal structure that provides a thermally decomposable surface for building a 3D printed object. After the solid metal structure solidifies, the slanted sidewalls 131 may provide a locking mechanism to prevent lift-up of the metal during powder bed fusion. The slanted sidewalls 131 may be used as a stand-alone solution to prevent metal lift-up during 3D printing or used in combination with other securing features, further described below.

As depicted by FIG. 1C, a sidewall 131 may slant at an angle θ relative to the perpendicular from the top surface of the recessed section to the bottom surface of the recessed section. In some implementations, θ can be from 5° to 60°, from 5° to 45°, from 15° to 45°, or from 15° to 30°. In some implementations, the slant angle can be adapted to optimize the tradeoff between the side wall slant and maximizing the area of the build surface for parts.

Extending through its bottom surface 120, the recessed section 140 includes a pour through hole 155 and multiple air/venting through holes 115. It may be advantageous to add one or more additional holes in the bottom of the cavity to function as air through holes 115 while a liquid metal is poured into the pour through hole 155 to form a thermally decomposable metal structure. These optional air through holes 115 can be located within the interior perimeter of the recessed section 140 or at another location and extend through the bottom side of the mold so that air can escape while filling metal into the pour through hole 155, preventing voiding in a solid metal structure 160 that is formed.

In alternative implementations, the recessed section 140 may include more than one pour through hole 155. In alternative implementations, the recessed section 140 may include one air through hole 115, or no air through holes 115.

In the illustrated example, the pour through hole 155 and air through holes 115 are each tapered such that the radius or perimeter of the hole on the exterior surface (i.e., bottom surface 120) of the build plate is larger than the radius or perimeter of the hole on the interior surface of the recessed section. As depicted, the pour through holes 155 and/or air through holes 115 may taper at angle φ relative to the perpendicular. In some implementations, φ can be from 5° to 60°, from 5° to 45°, from 15° to 45°, or from 15° to 30°. As further described below, by virtue of tapering the holes in this manner, a metal structure in recessed section 140 may be better stabilized during 3D printing.

The pour through hole(s) 155 and air through hole(s) 115 may range in size. A pour through hole 155 with at least a 1 cm diameter may be sufficiently large enough to introduce a liquid metal into the cavity by pouring. The air through hole(s) 155 may be smaller, on the order of ½ cm or less. Although the air through holes 115 are illustrated as being smaller than the pour through hole 155, the air through holes 115 may be larger. In some implementations, multiple holes having the same or similar diameter may function as both pour through holes and air through holes.

Recessed section 140 also includes blind holes 116 present on the interior portion of the build plate 100. Blind holes 116 extend from the interior of the recessed section 140 outward, but, unlike air through holes 115 and pour through hole 155, do not perforate through the exterior of the build plate. In this example, blind holes 116 taper such that the entry point of a blind hole located on the interior surface of the recessed section, has a smaller radius or perimeter than the radius or perimeter extending towards the exterior. In alternative implementations, the recessed section 140 may include one blind hole 116, or no blind holes 116. In some implementations, a blind hole 116 can taper at an angle relative to the perpendicular that can be from 5° to 60°, from 5° to 45°, from 15° to 45°, or from 15° to 30°.

The recessed section 140, including pour through hole 155, blind holes 116, and air through holes 115, may be formed via any suitable machining process such as by using a morticing machine, a metal lathe, a milling machine, a drill, etc. For example, the recessed section 140 may be formed by morticing a solid block of metal. Depending on the implementation, the top surface perimeter 141, bottom surface perimeter 142, and depth of recessed section 140 may be optimized for the 3D printing device and process used with build plate 100. For example, the perimeter of the cutout may be shaped such that it does not interfere with a 3D printing device securing mechanism (e.g., providing sufficient space for holes 101) while providing a large enough surface area to form a 3D printed object. In some implementations, sufficient depth may be provided to optimize cooling and provide for a deeper channel.

It should be appreciated that sidewall slope angles, hole locations, and hole shapes other than those illustrated may be utilized. For example, in some implementations, pour through hole 155, blind holes 116, or air through holes 115 may have a shape that is rectangular, square, or irregular. Additionally, in some implementations, one or more of these holes may not taper.

Figure 1D:
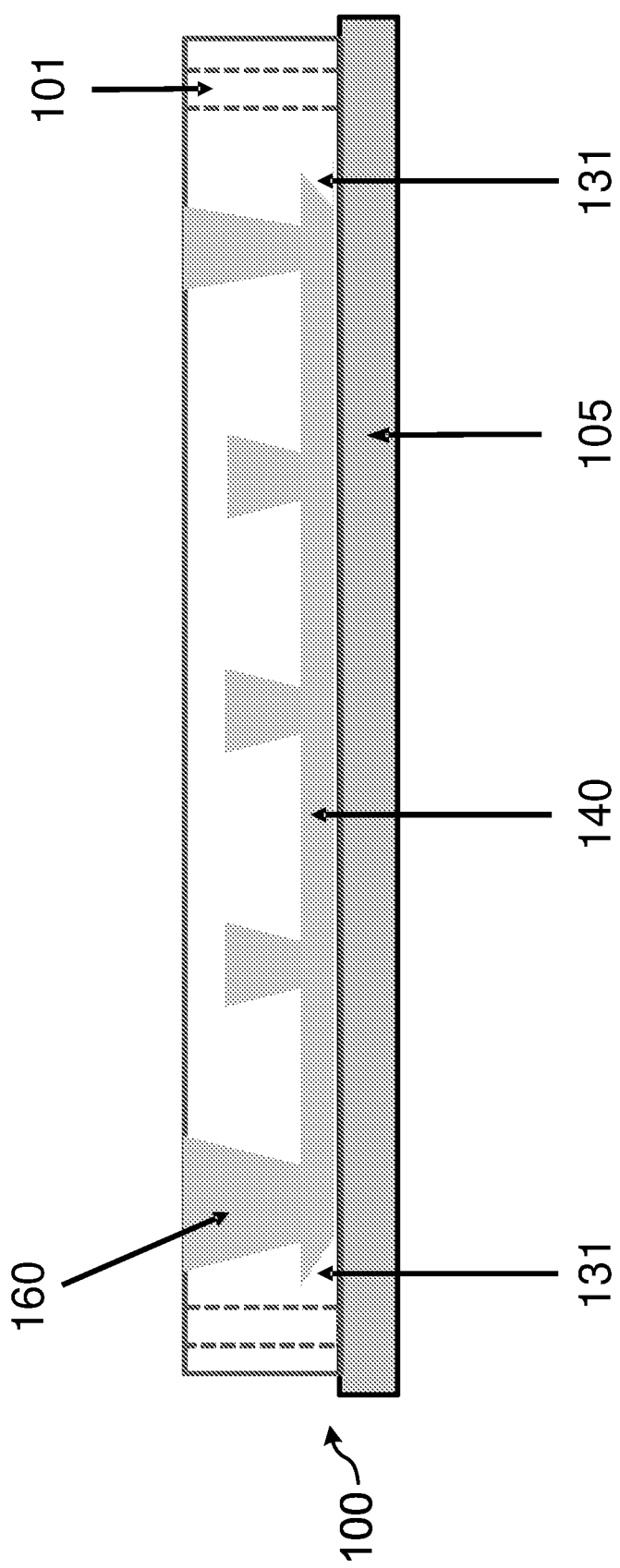
FIG. 1D shows a cross-sectional side view of the build plate of FIG. 1A after the solid metal printing structure has been formed in the build plate.

Referring to FIGS. 1C-1D, to form a metal structure 160 in the interior recessed section 140, a liquid metal or metal alloy 165 is poured through the pour through hole 155 extending from the exterior bottom surface 120 to the interior recessed section 140. Prior to pouring, the build plate 100 may be inverted by 180 degrees such that the pour through hole 155 faces upward, and the build plate 100 is placed against a smooth surface or lid 105, such as a graphite or granite slab. When placed, the lid 105 extends beyond at least the edges of the top surface of the recessed section 140.

A container 199 may be used to pour a liquid 165 of a metal or metal alloy through pour through hole 155 onto lid 105, filling the recessed section 140, including the through holes and blind holes. Prior to this step, a solid metal or metal alloy may be heated above its solidus temperature to form liquid 165. In this example, by virtue of adding the liquid 165 with the build plate 100 inverted, any unwanted accumulates (e.g., dross) may float to and settle at the top of the filled recessed section, ensuring a clean metal or metal alloy surface is formed where 3D printing occurs.

When liquid 165 (e.g., liquid metal) is poured into the recessed section 140 during the casting process, the metal may displace air and fill the cavity. If the air does not escape during the casting process, voiding can occur. Voiding may be undesirable as it may impede the flow of heat directly through the solid metal structure 160, into the build plate 100 and continuing downward through the 3D printing build chamber, potentially causing topside melting or deformation of the solid metal structure when subjected to laser heating during the 3D build process, further described below. As such, the presence of air through holes 115 may help eliminate unwanted voiding and ensure a steady, uninterrupted, downward thermal flow needed for a successful 3D metal print run. In some implementations, to further assist the air in escaping from the build plate 100, the build plate 100 may be angled (e.g., 30 degrees, 45 degrees, or 60 degrees) when pouring the liquid 165. The metal may enter through the bottom half of the pouring through hole 155 while air escapes through the top portion of the same hole. This technique may be particularly helpful in instances where the build plate structure has no air through holes 115.

As depicted in FIG. 1D, after solidifying, the solid metal structure 160 occupies the internal recessed section 140 of the build plate 100, such that the solid metal structure 160 touches the bottom and sidewalls of the interior recessed section and the lid 105, such as graphite or granite. Techniques other than those illustrated for forming the solid metal structure 160 may be utilized. In some configurations, such as with a book mold, the pour through hole may instead be located on the side of the build plate 100, and the build plate 100 may be stood on its opposing side during pouring of the liquid metal. In this configuration, the pour through hole may be located on the side surface of the build plate that is perpendicular to the build plate side abutted to the lid 105. In some configurations, the liquid metal or metal alloy may instead be poured from the opposite side, through the top surface of recessed section 140. In this implementation, a lid 105 may cover any openings in the bottom surface of the build plate, or the lid 105 may not be needed if there are no openings on the bottom surface.

During pouring and cooling, clamps or other retaining features may be utilized to hold the build plate 100 in contact with lid 105 (e.g., smooth slab surface) during pouring and cooling. Upon solidification of the metal, lid 105 is removed from contact with the build plate 100, exposing the smooth top surface of the solid metal structure 160, which then becomes the build surface during metal powder bed fusion. The smooth top surface may be flush to the top surface of the build plate. The material of lid 105 may be comprised of a material such that it does not bond with build plate 100 but may be mechanically held in place. To facilitate removal of lid 105 and ensure a smooth surface is formed (e.g., a flat surface flush to the top edges of the build plate recess), the lid 105 may be comprised of a material, e.g. graphite, polytetrafluoroethylene, ceramic, copper, stainless steel, tool steel, tin, aluminum, a non-stick metal, or some material that does not bond with liquid 165, before or after the liquid 165 solidifies.

In some implementations, the solid metal structure 160 is a solid metal or metal alloy having a melting point lower than that of the material (e.g., metal) of the unfilled build plate 100. The solidus temperature of the metal or metal alloy may be at least 30° C. lower than that of the build plate 100. In some implementations, the differences in melting point may be more significant. For example, in some implementations the solidus temperature of the metal or metal alloy may be at least 50° C. lower, 100° C. lower, 200° C. lower, 400° C. lower, 600° C. lower, 800° C. lower, 1000° C. lower, or even more than 1000° C. lower than the solidus temperature of the build plate 100.

In some implementations, the solid metal structure 160 is a solid metal or metal alloy having a solidus temperature of less than 300° C. In some implementations, it has a solidus temperature between 50° C. and 250° C. For example, the solid metal structure 160 may be a solder alloy such as tin alloys (e.g., 96.5Sn3Ag0.5Cu), bismuth alloys (e.g., 58Bi42Sn) or indium alloys (e.g., 52In48Sn). In some implementations, the solid metal structure can include at least 90% indium. In some implementations, the solid metal structure can be an InAg alloy. In other implementations, the solid metal structure 160 may be a single elemental metal such as tin, indium, bismuth, or others.

Figure 1E:
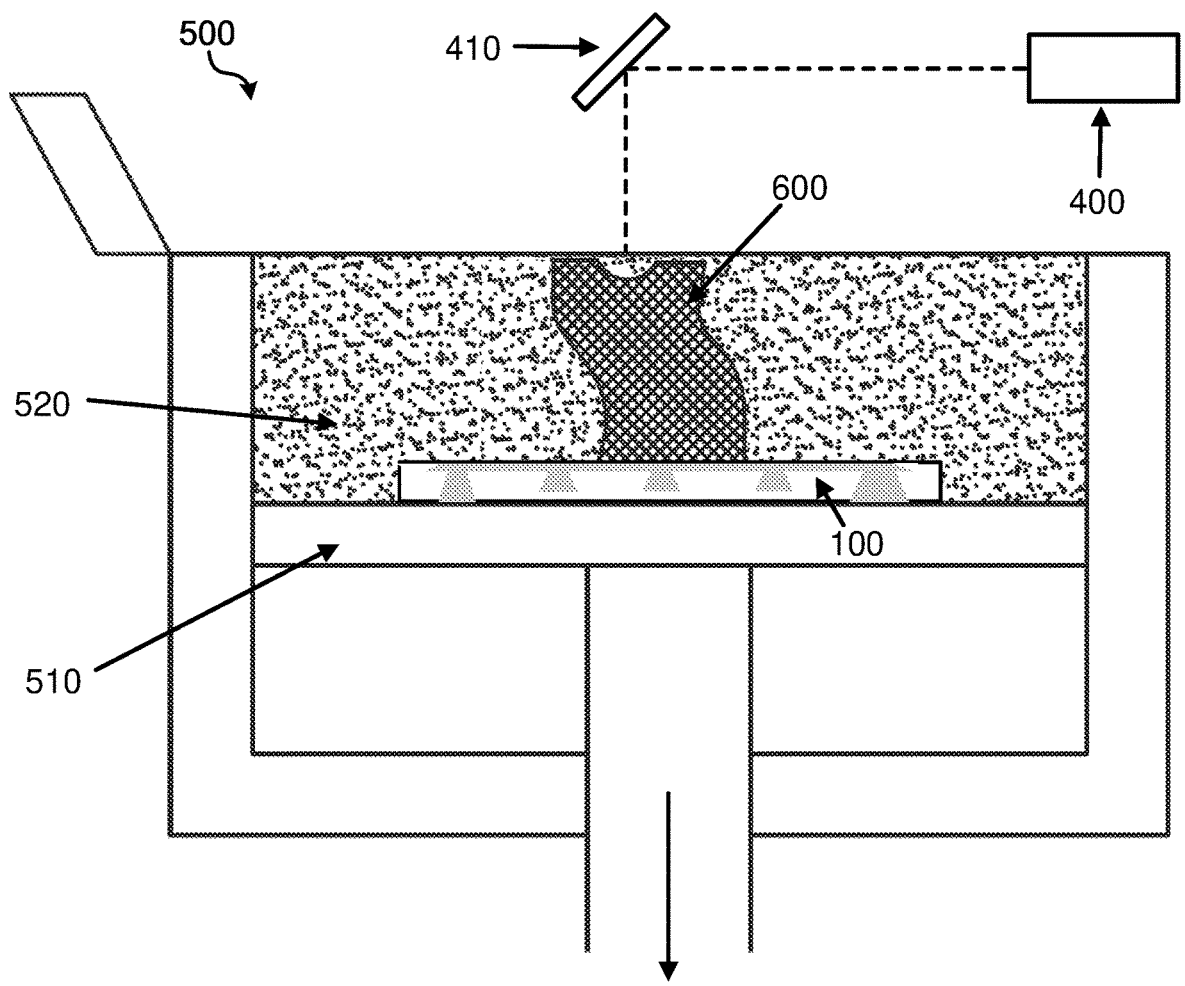
FIG. 1E illustrates a 3D metal printing process including a 3D metal printing device using a metal powder bed and a laser to form a 3D printed object on the build plate of FIG. 1D, in accordance with some implementations of the disclosure.

FIG. 1E illustrates a 3D metal printing process including a 3D metal printing device 500 using a metal powder bed 520 and a laser 400 to form a 3D printed object 600 on a build plate 100, in accordance with implementations of the disclosure. Also shown is build plate loading platform 510 and optical component 410 for directing the output of a laser 400. The metal powder bed 520 may comprise aluminum, cobalt, copper, nickel, steel, stainless steel, titanium, vanadium, tungsten carbide, gold, bronze, platinum, silver alloys, cobalt-chromium alloys, refractory metals, a combination thereof, or some other suitable metal or metal alloy for forming 3D printed object 600.

To prepare device 500 for printing, a build plate as described herein (e.g., build plate 100) may be placed into the device 500 and secured to the build plate loading platform 510 by fasteners with the build surface facing upwards. The device 500 may be loaded with metal powder and a chamber door closed. The chamber may then be filled with an inert gas such as nitrogen or argon to prevent oxidation during the printing process. In some implementations, the 3D printing chamber and/or the build plate may be pre-heated at a temperature below the solidus temperature of solid metal structure 160.

At the start of printing, a re-coater blade or other component of device 500 may deposit metal powder over the top surface of build plate 100, including solid metal structure 160. A laser 400 or a series of lasers may then lase/sinter the deposited metal powder and metallurgically join/weld, a layer of what will become the 3D printed object, to the build surface of solid metal structure 160. The process may repeat layer by layer until the print is complete. The device 500 may include a lowering mechanism (e.g., as part of platform 510) apparatus to allow for subsequent metal layers of the 3D printed object 600 to be formed. As the apparatus and build plate are lowered, a metal powder layer may be added to the top surface and a laser or laser(s) used to selectively join/sinter areas to the 3D printed object 600 below.

During 3D printing, the laser power, re-coater blade speed, pause time between layers as well as other parameters can be adjusted to allow for the melted powder to solidify between laser passes. The first 1-10 layers may be critical as these passes form the intermetallic layer between the solid metal structure 160 and the 3D printed object 600, securing the object to the build surface.

The heat generated by laser 400 during 3D printing may increase the temperature of solid metal structure 160. One problem that this may cause is premature melting of solid metal structure 160. To prevent premature melting of solid metal structure 160 during 3D printing, this increase in temperature may be accounted for when selecting a suitable metal or metal alloy 160. In some implementations, the power of laser 400 may be decreased and/or other parameters may be adjusted while forming lower layers of 3D printed object 600 to prevent overheating of the solid metal structure 160 during 3D printing.

Another problem that may occur due to laser heating of the metal, and also due to subsequent pauses between layers, is thermal expansion and contraction of the solid metal structure 160. This can cause the solid metal structure 160, which serves as the build surface, to lift from the recessed section of the build plate 100. This lift up is undesirable as it can cause errors in the overall height (z-axis) of the 3D printed object 600. If the lift up is not uniform, then additional errors in the x-y plane can occur, causing the 3D printed object 600 to be built outside of the desired specifications.

As described herein, a build plate may be designed with various features to help secure the solid metal structure 160 within the interior recessed section of the build plate, to prevent lift-up and build failure during 3D printing. In some implementations, these features may be subtractive features formed through the recessed section of the build plate 100. For example, as described above, a build plate 100 can include a recessed section having slanted sidewalls 131, one or more tapered through holes (e.g., pour through hole 155 and air through holes 115), and/or one or more tapered blind holes 116. The slanted sidewalls 131 may provide a locking mechanism to prevent lift-up of the solid metal structure during powder bed fusion. The tapering of the through or blind holes such that the radius or perimeter of the hole decreases toward the top surface (i.e., print surface of the build plate 100) may also create a securing mechanism for the solid metal structure 160 formed through these holes.

Other subtractive securing features may be utilized in place of or in addition to those depicted for build plate 100. For example, grooves may be formed on the interior bottom and/or sidewalls 131 of the recessed section 140. Additionally, a tapered hole may be formed on at least one sidewall 131, where the taper may be such that the radius or perimeter of the hole decreases from the interior to the surface of the sidewall 131.

Figure 2A:
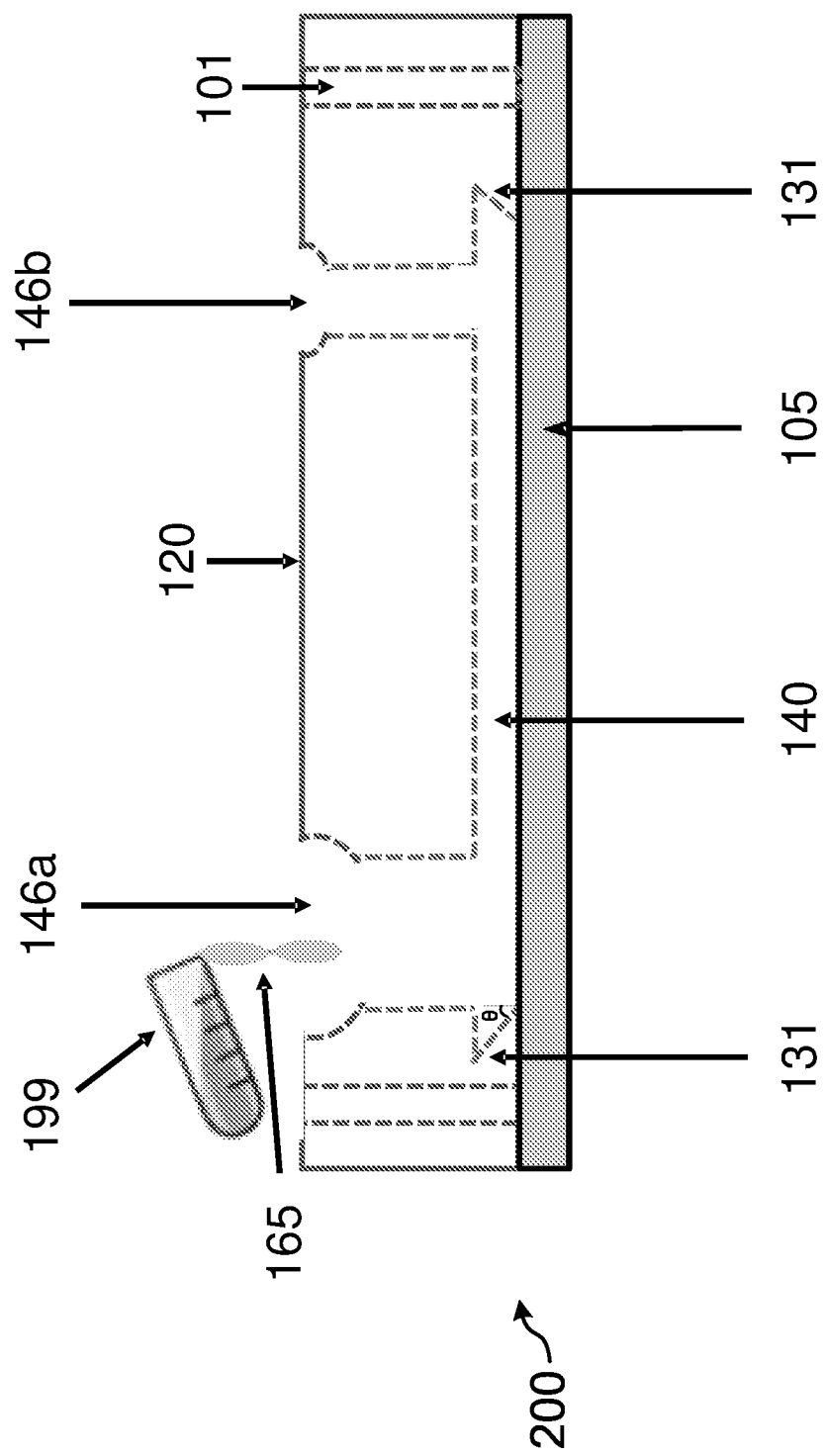
FIG. 2A shows a cross-sectional view of another build plate including a locking mechanism for preventing, during 3D printing, lift-up of a solid metal printing structure formed in the build plate prior to 3D printing, in accordance with some implementations of the disclosure.
Figure 2B:
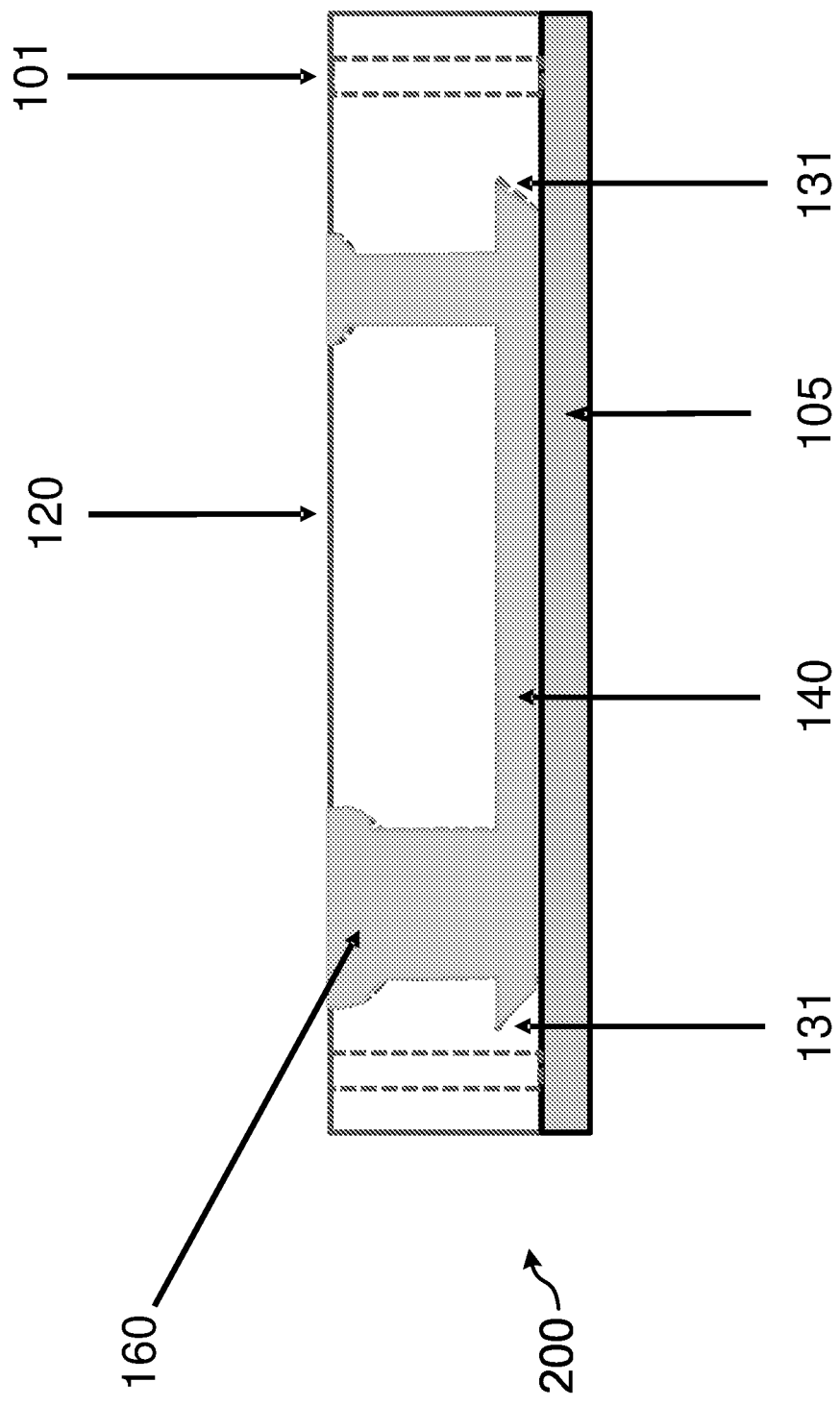
FIG. 2B shows a cross-sectional view of the build plate of FIG. 2A after the solid metal printing structure has been formed in the build plate.

Other hole structures for securing the solid metal structure may be utilized in place of or in addition to the tapered through holes described herein. For example, in some implementations counterbores or countersinks may be formed through the bottom surface or sidewalls of the recessed section. FIGS. 2A-2B illustrate cross-sectional side views of an example of a build plate 200 utilizing countersunk through holes. The recessed section 140 of build plate 200 in this example includes countersunk pour through hole 146a and countersunk air through hole 146b. Although not illustrated in this example, one or more countersunk blind holes may also be formed. A countersunk through hole as depicted may be formed by drilling through the bottom surface 120 of the build plate 200 to the recessed section 140, a hole of equal radius throughout. Thereafter a drill bit with a larger radius may be used to drill partially (e.g., about ¼, ⅓, ½, etc. of the way through) into the existing hole from the bottom surface 120 of the build plate 200, thereby forming a countersink. The countersink bit may be straight or tapered provided that the opening of the hole on the bottom of the build plate is larger than the opening of the hole on the bottom surface of the interior recessed section bottom. When filled with solid metal structure 160, the countersunk feature on the bottom of the build plate prevents lift-up of the solid metal structure 160 during 3D printing.

The features to help secure the solid metal structure within the interior recessed section of the build plate need not be limited to subtractive features (e.g., holes and grooves) that are present on the interior recessed section of the build plate, some of which extend partially or fully through the build plate metal towards and/or through to the exterior surface of the build plate. In some implementations, positive features such as lands may be present on the interior surface of the recessed section. These features may be created during the subtractive process of forming a groove. If the build plate itself was created by additive manufacturing, then the lands may be created additively, and the grooves may be passively created relative to the lands. A combination of lands, grooves, and/or holes located on the interior surface of the recessed section may serve as anchoring points to prevent lift up of the solid metal structure. These features, while originating in the interior section of the recessed section, may extend through the build plate walls towards the exterior of the build plate as in the case of subtractive holes and grooves. These subtractive features can extend outward into the sidewalls or outward into the bottom of the build plate.

Positive features (e.g., lands) originating on the interior of the recessed section may extend inward and be fully contained within the recessed section cavity. To prevent interference during the 3D printing process, positive features may be designed not to protrude above the build surface once the cavity is filled with a liquid metal that solidifies into the solid metal structure.

More generally, the subtractive and positive relief features designed into the interior of the recessed section may be straight, tapered, dovetail-shaped or irregularly shaped. There may be one feature or many features. There may be multiple features of the same type or a combination of features including a combination of lands, grooves, and tapered or untapered holes. The features many be contiguous or discrete. The features many be contained within the interior recessed section or may extend partially or fully through the build plate toward the exterior surface.

In some implementations, there may be one or more subtractive channels extended along at least a portion of one of the sidewalls and/or bottom surface of the recessed area. In other implementations, the channel may extend along the entire perimeter of the of the recessed cavity of the build plate. The channel(s) may be dove-tailed shaped. The dovetailed channel may extend along the interior perimeter of recessed section 140 and protrude partially into the build plate toward an exterior surface of the build plate. The dovetail direction may be such that the arc of the angle of the dovetail originating on the interior of the recessed section is less than the arc of the angle where the dovetail channel terminates within the sidewall of the build plate. The smaller opening of the dovetail may sit flush with the recessed cavity sidewall and extend outward through the build plate metal towards the exterior surface of the build plate. The channel(s) may be discrete or contiguous and may extend along the entire perimeter of the bottom and/or side surface of the recessed section such that the smaller opening of the dovetail sits flush with the recessed cavity bottom and extends downward through the build plate metal towards the exterior bottom surface of the build plate. These channels may replace other locking features or used in combination with discrete locking features to enhance the retention of the solid metal structure during 3D printing to prevent lift-up of the solid metal structure build plate surface.

Figure 3:
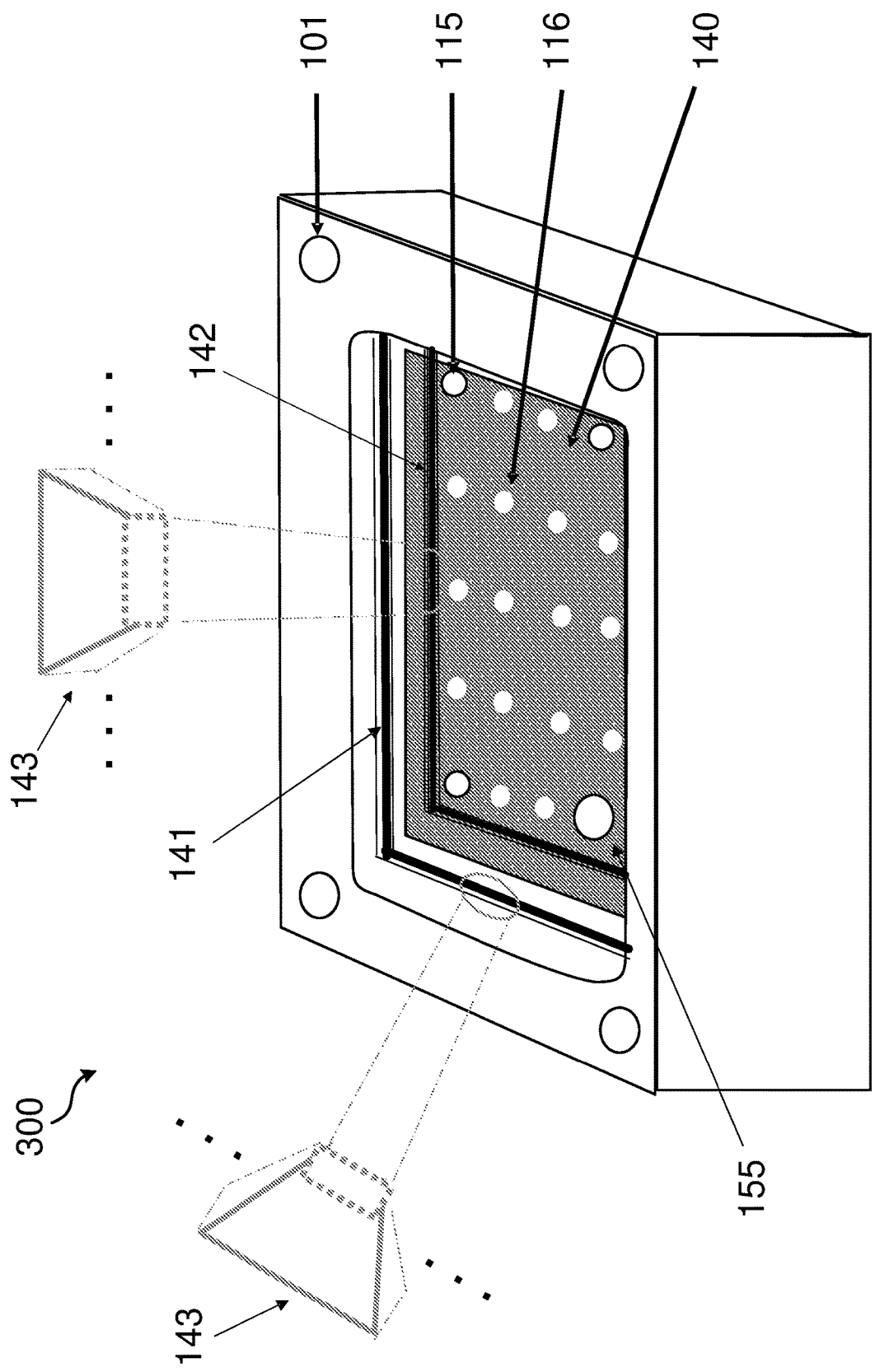
FIG. 3 shows a top perspective view of another build plate including a locking mechanism for preventing, during 3D printing, lift-up of a solid metal printing structure formed in the build plate prior to 3D printing, in accordance with some implementations of the disclosure.

FIG. 3 shows a perspective view of an example of a build plate 300 that implements subtractive and positive relief features, in accordance with some implementations of the disclosure. As depicted, in addition to pour through hole 155, air through holes 115, and blind holes 116, build plate 300 includes two dove-tailed shaped channels 143, each channel having alternating dovetails along its length.

Figure 4A:
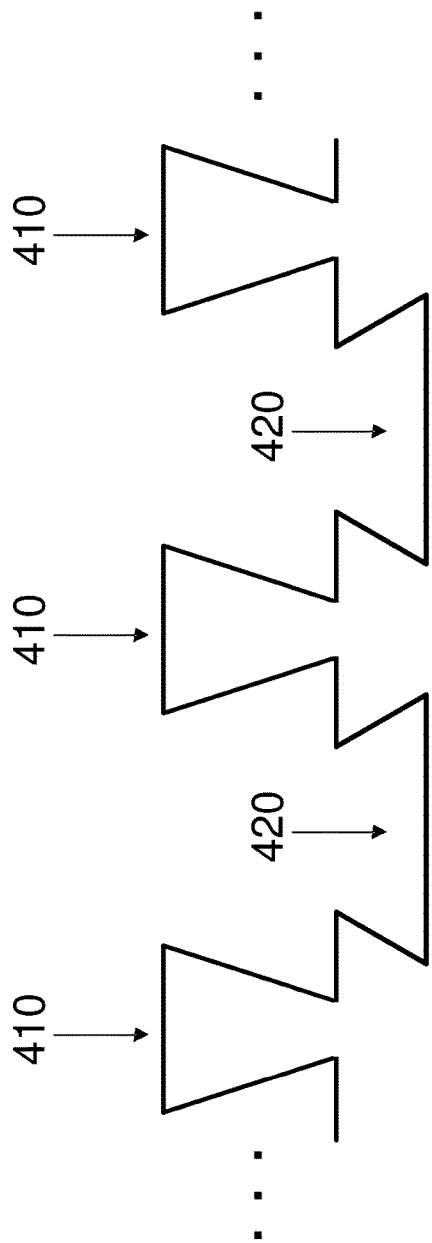
FIG. 4A shows a cross-sectional view of an example of a combination of positive relief features and subtractive relief features that can be formed on a bottom or side surface of a recessed section of a build plate, in accordance with some implementations of the disclosure.
Figure 4B:
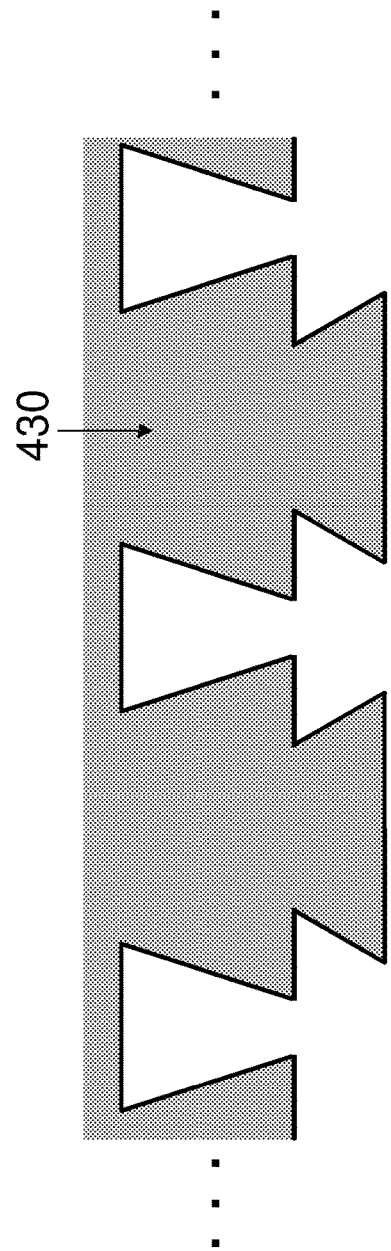
FIG. 4B shows the relief features of FIG. 4A after the recessed section is filled with a solid metal or metal alloy.

FIGS. 4A-4B show cross-sectional views of an additional example of a combination of positive relief features 410 and subtractive relief features 420 that can be formed on a bottom or side surface of a recessed section of a build plate as described herein. FIG. 4A depicts the relief features before the recessed section is filled with a solid metal alloy. FIG. 4B depicts the relief features after the recessed section is filled with solid metal or metal alloy 430.

The relief features as described herein may be created by a Computer Numerical Control (CNC) machine, drill, router, additive manufacturing or by any other process for adding or removing metal or other material for the purpose of creating lands, grooves, holes, or other subtractive and/or positive features to serve as anchor points for the solidified metal that provides the 3D printing build surface. Land and groove features may also be created by thermal spray or by sand-blasting, respectively, on the interior bottom and sidewalls of the recessed section, and/or its protrusions, grooves, or holes located fully within the recessed section cavity or extending outward partially or fully into the build plate bottom or sidewalls.

Figure 1F:
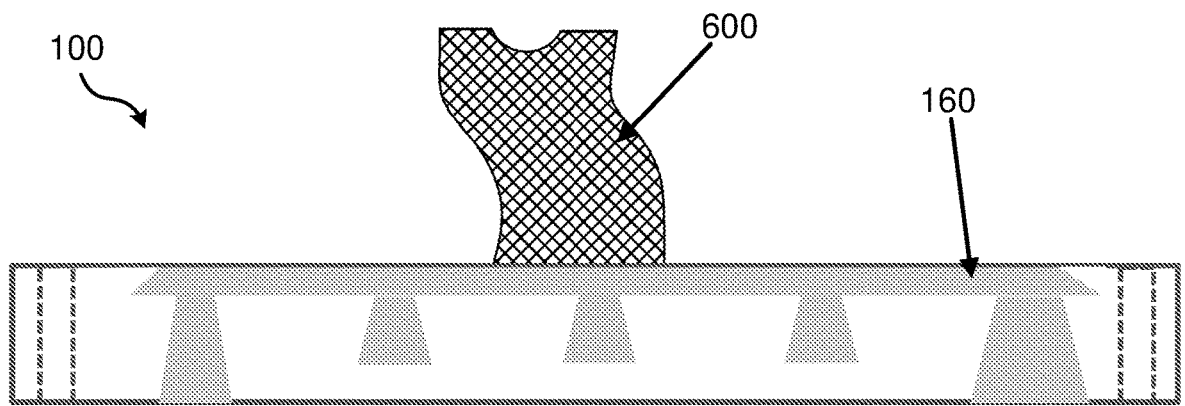
FIG. 1F shows an assembly including a metal 3D printed object metallurgically joined onto a build plate after the completion of 3D printing, in accordance with some implementations of the disclosure.

At the completion of 3D printing, build plate 100 with 3D printed object 600 may be removed from 3D printing device 500. For example, FIG. 1F shows an assembly including the metal 3D printed object 600 metallurgically joined onto a build plate 100 after the completion of 3D printing. The melting temperature of the metal or metal alloy that is used to form 3D printed object 600 is higher than that of the solid material 160. For example, similar to the build plate 100, the solidus temperature of the 3D printed object 600 may be at least 30° C. higher than the solidus temperature of the metal or metal alloy. In some implementations, the differences in melting point may be more significant. For example, in some implementations the solidus temperature of the 3D printed object 600 may be 50° C. higher, 100° C. higher, 200° C. higher, 400° C. higher, 600° C. higher, 800° C. higher, 1000° C. higher, or even more than 1000° C. higher than the solidus temperature of the metal or metal alloy of solid material 160. In some implementations, the metal powder used to form 3D printed object 600 may comprise aluminum, cobalt, copper, nickel, steel, stainless steel, titanium, vanadium, tungsten carbide, gold, bronze, platinum, silver alloys, cobalt-chromium alloys, refractory metals, a combination thereof, or some other suitable metal or metal alloy.

Following 3D printing, the 3D printed object 600 is separated from build plate. To this end, the assembly, including the build plate and 3D printed object, may be heated (e.g., by placing the assembly in an oven) to a temperature above the solidus temperature of the lower melting temperature solid metal structure 160, thereby melting away the metal and releasing the 3D printed object. In other implementations, the 3D printed object 600 may be thermally separated from the solid metal 160 by a heat source other than an oven such as by blow torch, heated air, heated liquid, hotplate, laser, or any other suitable heat source sufficient to melt the solid metal structure 160, thereby releasing the 3D printed object 600. The melted metal or metal alloy may be collected in a container or collection apparatus while the 3D printed object 600 and the remaining structure of the build plate, including the recessed section, remain solid. Prior to melting of the solid metal structure, the assembly including the build plate and 3D printed object may be placed in a container. The liquid metal or metal alloy that melts may flow through the recessed section and/or through holes (if any) of the build plate and into the container. The collected metal or metal alloy may be reused to refill the recessed section of the build plate or another build plate for future 3D printing operations.

During the removal process, the 3D printed object 600 may be held in place by a tool. For example, in one implementation, the removal process includes at least the following steps: melting the solid metal structure while holding the 3D printed object; after melting the solid metal structure, removing the 3D printed object from the build plate; and after removing the 3D printed object from the build plate, positioning (e.g., tilting, inverting, rotating, etc.) the build plate to empty the liquid metal or metal alloy. After separation of the 3D printed object 600, the object 600 may be post processed (e.g., polished, reshaped, and/or grinded) as needed.

In some implementations, the process of removing the 3D printed object and/or collecting the melted metal or metal alloy may be incorporated into a compartment of a 3D printing assembly.

Although embodiments have thus far been described in the context of forming a solid metal structure 160 in a recessed section 140 of a build plate having one or more subtractive and positive features that stabilize the 3D printing build surface of the solid metal structure, it is contemplated that a pre-shaped solid metal insert may be formed outside of the build plate (e.g., in a casting mold) and subsequently inserted/secured into the recessed section of the build plate.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

It should be appreciated that all combinations of the foregoing concepts (provided such concepts are not mutually inconsistent) are contemplated as being part of the inventive subject matter disclosed herein. In particular, all combinations of claimed subject matter appearing in this disclosure are contemplated as being part of the inventive subject matter disclosed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

It should be appreciated that all combinations of the foregoing concepts (provided such concepts are not mutually inconsistent) are contemplated as being part of the inventive subject matter disclosed herein. In particular, all combinations of claimed subject matter appearing in this disclosure are contemplated as being part of the inventive subject matter disclosed herein.

What is claimed is:

1. A method, comprising:
obtaining an additive manufacturing build plate comprising a body having a recessed section formed through a first surface of the body, the recessed section including a bottom surface within the body and sidewalls extending to the bottom surface; and
forming, within the recessed section, a solid form of a metal or metal alloy by pouring, into the recessed section, a liquid form of the metal or metal alloy that substantially fills the recessed section and solidifies into the solid form, wherein the solid form of the metal or metal alloy has a printing surface for forming a 3D object in a 3D printing device, and the recessed section comprises a locking mechanism configured to prevent lift-up of the solid form of the metal or metal alloy during 3D printing in the 3D printing device.

2. The method of claim 1, wherein:
pouring the liquid form of the metal or metal alloy into the recessed section comprises pouring, into a pour through hole of the recessed section, the liquid form of the metal or metal alloy;
the solid form of the metal or metal alloy extends into the pour through hole;
the locking mechanism comprises the pour through hole; and
prior to being filled with the solid form of the metal or metal alloy, the pour through hole has an opening that is larger at an exterior surface of the body than at the bottom surface of the recessed section.

3. The method of claim 2, wherein the pour through hole extends through the bottom surface of the recessed section to a second surface of the body opposite the first surface.

4. The method of claim 3, wherein pouring the liquid form of the metal or metal alloy into the pour through hole comprises: pouring the liquid form of the metal or metal alloy through an opening of the pour through hole at the second surface of the body.

5. The method of claim 4, wherein the pour through hole is tapered at an angle from 5 degrees to 45 degrees relative to a perpendicular to the bottom surface of the recessed section.

6. The method of claim 3, wherein the pour through hole is tapered relative to a perpendicular to the bottom surface of the recessed section.

7. The method of claim 2, wherein:
forming the solid form of the metal or metal alloy further comprises releasing, via an air through hole of the recessed section, air displaced by the liquid form of the metal or metal alloy;
the solid form of the metal or metal alloy extends into the air through hole;
the locking mechanism further comprises the air through hole; and
prior to being filled with the solid form of the metal or metal alloy, the air through hole has an opening that is larger at an exterior surface of the body than at the bottom surface of the recessed section.

8. The method of claim 2, wherein the pour through hole is a counterbore or countersink.

9. The method of claim 2, further comprising:
after forming the solid form of the metal or metal alloy, placing the additive manufacturing build plate in the 3D printing device; and
3D printing the 3D object on the printing surface, wherein the locking mechanism, including the pour through hole, prevents lift-up of the solid form of the metal or metal alloy caused at least in part by a temperature increase of the metal or metal alloy during 3D printing.

10. The method of claim 1, further comprising:
after forming the solid form of the metal or metal alloy, placing the additive manufacturing build plate in the 3D printing device; and
3D printing the 3D object on the printing surface, wherein the metal or metal alloy has a solidus temperature lower than a solidus temperature of the additive manufacturing build plate and the 3D object, and the locking mechanism prevents lift-up of the solid form of the metal or metal alloy caused at least in part by a temperature increase of the metal or metal alloy during 3D printing.

11. The method of claim 10, further comprising: after 3D printing the 3D object on the printing surface, separating the 3D object from the build plate by heating the solid form of the metal or metal alloy in the recessed section to a temperature above the solidus temperature of the metal or metal alloy.

12. The method of claim 1, wherein:
pouring the liquid form of the metal or metal alloy into the recessed section comprises pouring the liquid form of the metal or metal alloy such that it is in touching relation with the sidewalls;
the locking mechanism comprises the sidewalls; and
at least one of the sidewalls is angled such that a perimeter of the bottom surface of the recessed section is greater than a perimeter of a top of the recessed section.

13. The method of claim 12, wherein the at least one of the sidewalls is angled from 5 degrees to 45 degrees relative to a perpendicular to the bottom surface of the recessed section.

14. The method of claim 12, further comprising:
after forming the solid form of the metal or metal alloy, placing the additive manufacturing build plate in the 3D printing device; and
3D printing the 3D object on the printing surface, wherein the locking mechanism, including the sidewalls, prevents lift-up of the solid form of the metal or metal alloy caused at least in part by a temperature increase of the metal or metal alloy during 3D printing.

15. The method of claim 1, wherein:
pouring the liquid form of the metal or metal alloy into the recessed section comprises pouring the liquid form of the metal or metal alloy such that it substantially fills a channel extending along at least a portion of the sidewalls or the bottom surface of the recessed section; and
the locking mechanism comprises the channel.

16. The method of claim 15, wherein the channel comprises multiple dovetails.

17. The method of claim 15, further comprising:
after forming the solid form of the metal or metal alloy, placing the additive manufacturing build plate in the 3D printing device; and
3D printing the 3D object on the printing surface, wherein the locking mechanism, including the channel, prevents lift-up of the solid form of the metal or metal alloy caused at least in part by a temperature increase of the metal or metal alloy during 3D printing.

18. The method of claim 1, wherein:
pouring the liquid form of the metal or metal alloy into the recessed section comprises pouring the liquid form of the metal or metal alloy such that it substantially fills a blind hole formed through the bottom surface of the recessed section to an interior of the build plate;
the blind hole has an opening that is smallest at the bottom surface of the recessed section; and
the locking mechanism comprises the blind hole.

19. A method, comprising:
placing an additive manufacturing build plate in a 3D printing device, the additive manufacturing build plate comprising:
a body having a recessed section formed through a first surface of the body, the recessed section including a bottom surface within the body and sidewalls extending to the bottom surface; and
a solid form of a metal or metal alloy formed within the recessed section by pouring, into the recessed section, a liquid form of the metal or metal alloy that substantially fills the recessed section and solidifies into the solid form, wherein the solid form includes a printing surface for forming a 3D object in the 3D printing device, the metal or metal alloy has a solidus temperature lower than a solidus temperature of the additive manufacturing build plate and the 3D object, and the recessed section comprises a locking mechanism; and
3D printing the 3D object on the printing surface of the solid form of the metal or metal alloy, wherein during 3D printing the locking mechanism prevents lift-up of the solid form of the metal or metal alloy caused at least in part by a temperature increase of the metal or metal alloy.

* * * * *